United States Patent
Lee et al.

(10) Patent No.: US 9,523,017 B2
(45) Date of Patent: Dec. 20, 2016

(54) HALOGEN-FREE WATERBORNE COATING COMPOSITION

(75) Inventors: Chai-Ki Lee, Gyeonggi-do (KR); Young-Tae Park, Gyeonggi-do (KR); Peng-Sam Park, Incheon (KR)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 337 days.

(21) Appl. No.: 13/995,144

(22) PCT Filed: Dec. 23, 2011

(86) PCT No.: PCT/KR2011/010054
§ 371 (c)(1),
(2), (4) Date: Jun. 17, 2013

(87) PCT Pub. No.: WO2012/087070
PCT Pub. Date: Jun. 28, 2012

(65) Prior Publication Data
US 2013/0273385 A1    Oct. 17, 2013

(30) Foreign Application Priority Data
Dec. 24, 2010    (KR) .................. 10-2010-0134245

(51) Int. Cl.
C09D 133/00    (2006.01)
C09D 133/04    (2006.01)
C09D 123/02    (2006.01)

(52) U.S. Cl.
CPC .......... C09D 133/00 (2013.01); C09D 123/02 (2013.01); C09D 133/04 (2013.01); Y10T 428/31913 (2015.04); Y10T 428/31938 (2015.04)

(58) Field of Classification Search
None
See application file for complete search history.

(56) References Cited

U.S. PATENT DOCUMENTS

2004/0162403 A1*    8/2004    Shimizu et al. .............. 526/160
2007/0259123 A1    11/2007    Nagano et al.

FOREIGN PATENT DOCUMENTS

| EP | 0 725 111 | 8/1996 |
|---|---|---|
| JP | 2003-313331 | 4/2002 |
| KR | 10-2007-0042992 | 4/2007 |
| WO | 98/37129 | 8/1998 |
| WO | 2012/087070 | 6/2012 |

OTHER PUBLICATIONS

International Search Report and Written Opinion for International Application No. PCT/KR2011/010054 mailed on Mar. 19, 2012.
International Preliminary Report on Patentability for International Application No. PCT/KR2011/010054 mailed on Jul. 4, 2013.

* cited by examiner

*Primary Examiner* — Sheeba Ahmed
(74) *Attorney, Agent, or Firm* — Andrews Kurth Kenyon LLP

(57) ABSTRACT

The present invention provides a mono coating film type waterborne coating composition comprising halogen free polyolefin resin, acryl polyol, acryl emulsion, and a solvent. According to the present invention, adhesion to a polyolefin substrate is excellent, and physical/chemical properties may be maintained with a single coating film instead of the currently used dual coating films, by a halogen free waterborne composition with physical/chemical properties similar to or more excellent than the existing oil coating or halogen-containing coating composition. Since these effects may be sufficiently obtained with a single coating film, consumption of coating may be reduced about 30~40% compared to the existing method, and particularly, cost reduction may be expected through decrease in equipment required for dual coating film, energy for drying coating film, attractive force of coating, productivity increase, and the like.

19 Claims, No Drawings

HALOGEN-FREE WATERBORNE COATING COMPOSITION

REFERENCE TO RELATED APPLICATIONS

This application is the U.S. National Phase of PCT/KR2011/010054 filed on Dec. 23, 2011, and claims the benefit of Korean Application No. 10-2010-0134245, filed on Dec. 24, 2010.

FIELD OF THE INVENTION

The present invention relates to a halogen-free waterborne coating composition and a coating film product.

BACKGROUND OF THE INVENTION

Polyolefin based resin is commonly used for interior furnishings of automobiles such as an installment panel, an airbag cover, a dash board, and the like. To use parts made of polypropylene in automobiles, a coating process is required to match with the color of an automobile. However, since polypropylene is non-polar due to the molecular structure and has high internal crystallinity, it has very low coating adhesion. Therefore, to adhere a desired coating on a substrate made of polypropylene, a chemical or physical treatment process is required.

To improve adhesion of coating on a polyolefin based substrate such polypropylene (PP), polyethylene (PE), and the like, a method of treating hydrofluoric acid and ozone has been used for chemical treatment, and a treatment method such as plasma and corona discharge, and the like has been used for physical treatment. And, flame treatment or primer treatment with a chlorinated polyolefin (hereinafter, referred to as 'CPO') resin composition may be conducted before coating. However, the flame treatment is not applied except several countries due to investment cost and space problem because the coating operation should be conducted immediately after the flame treatment and facilities are required. And, the CPO resin raises environmental problem because an organic solvent type coating composition dissolved in an aromatic organic solvent such as toluene, xylene, and the like is used. Thus, an aqueous CPO resin without an organic solvent was developed several years ago, and an aqueous primer using the aqueous COP resin has been gradually applied, and thus a more environment friendly coating composition has been developed. However, these compositions also include halogen, and are deleterious to human body, and thus, there use is limited in several European countries.

Moreover, primer coating treatment is required for adhesion, and the coating is composed of multilayers including additional coatings for physical and chemical properties, and thus, operation time may be increased, cost may be increased due to increase in consumption of a coating composition, thereby increasing cost of the final product.

The present invention provides a solution to the above problems by decreasing cost and providing a material that is more environment-friendly. Most of the currently used compositions are organic solvent based, and thus are harmful to the workers and users, and particularly, to the environment due to their exposure to the air. Further, the CPO resins used to be coated on the polyolefin based material have potential problems due to the chloride being used, which is harmful to the human body. In terms of cost reducing, the conventional composition requires a first coating to enhance adhesion to the polyolefin based material, and a second coating to enhance the physical/chemical properties, while the composition according to the present invention needs only one coating to accomplish the properties.

SUMMARY OF THE INVENTION

Accordingly, one aspect of the present invention provides a mono coating film type waterborne coating composition comprising halogen free polyolefin resin, acryl polyol, acryl emulsion, and a solvent. It may further comprise a pigment and additives, and a curing agent may be included during preparation or additives may be introduced and mixed before a coating process.

The waterborne coating composition may comprise 25~65 parts by weight of halogen-free polyolefin resin, 5~40 parts by weight of acryl polyol, and 5~40 parts by weight of acryl emulsion, based on 100 parts by weight of total solid content. If a pigment is added, the composition may comprise 2~10 parts by weight of the pigment.

Another aspect of the present invention provides a coating film product formed by coating the mono coating film type waterborne coating composition on a polyolefin based substrate. The coating of the mono coating film type waterborne coating composition may be conducted without primer treatment.

According to the present invention, excellent adhesion to a polyolefin substrate may be obtained, and physical/chemical properties may be maintained with a single coating film instead of the currently used dual coating films, by a halogen free waterborne composition with physical/chemical properties similar to or more excellent than the existing oil coating or halogen-containing coating composition. Since these effects may be obtained with a single coating film, consumption of coating may be reduced about 30~40% compared to the existing method, and particularly, cost reduction may be expected through decrease in equipment required for dual coating film, energy for drying coating film, attractive force of coating, productivity increase, and the like.

DETAILED DESCRIPTION OF THE INVENTION

Hereinafter, the present invention will be explained in detail. The following explanations are specific examples of the invention, and even if conclusive or limitative expressions are described, should not be interpreted as limiting the scope of the invention, which is determined by the appended claims.

The mono coating film type waterborne coating composition according to one embodiment comprises halogen free polyolefin resin, acryl polyol, acryl emulsion, and a solvent. It may further comprise a pigment and additives, and a curing agent may be included during a preparation process or additives may be introduced and mixed before a coating process. It may comprise 25~65 parts by weight of halogen-free polyolefin resin, 5~40 parts by weight of acryl polyol, and 5~40 parts by weight of acryl emulsion, based on 100 parts by weight of total solid content. If a pigment is added, the composition may comprise 2~10 parts by weight of the pigment.

Hereinafter, each ingredient will be explained in detail.

Halogen-Free Polyolefin Resin

The halogen-free polyolefin resin may influence on adhesion according to the molecular weight, and as the weight average molecular weight increases, adhesion to a polyolefin substrate may increases as non-polarity increase. Due to the resulting decreased compatibility with the acryl polyol, which is a polar resin used in the coating, and acryl emulsion, storage stability, appearance (gloss, surface smoothness), physical and chemical properties may be deteriorated. Therefore, it may be preferable to use the halogen-free polyolefin under specific conditions. Particularly, if halogen-free polyolefin having a weight average molecular weight of less than 80,000 is used, adhesion may be decreased, and if the weight average molecular weight is greater than 150,000, gloss and storage stability of the coating may be deteriorated. Further, if the content of the halogen-free polyolefin is less than 25 parts by weight, based on 100 parts by weight of the total solid contents, adhesion to the substrate may be deteriorated due to decrease in non-polarity in the coating, and if it is greater than 65 parts by weight, physical and chemical properties may be deteriorated.

The halogen-free polyolefin that can be used in the present invention is not specifically limited as long as it does not contain halogen, and it may be variously modified. One example may be as follows, and it may be dispersed in an aqueous medium. The aqueous dispersion (A) of the halogen-free modified polyolefin is formed by dispersing unsaturated carboxylic acid or acid anhydride modified polyolefin (a) in an aqueous medium.

The unsaturated carboxylic acid or acid anhydride modified polyolefin(a) may be obtained by graft copolymerization of unsaturated carboxylic acid or acid anhydride to polyolefin by a known method. The unsaturated carboxylic acid or acid anhydride modified polyolefin that can be used for modification may include C3~10 aliphatic carboxylic acid or anhydrides thereof, which contains at least one, preferably one polymeric double bond in one molecule and does not contain halogen, and specific examples thereof may include (meth)acrylic acid, maleic acid, fumaric acid, itaconic acid, maleic anhydride, and the like, preferably maleic acid and maleic anhydride. Graft copolymerization amount of the unsaturated carboxylic acid or acid anhydrides thereof to polyolefin may be carried according to desired properties of modified polyolefin, but in general, it may be 1~20 wt %, preferably 1.5~15 wt %, more preferably 2~10 wt %, based on the weight of the solid content of the polyolefin.

Meanwhile, examples of the polyolefin that can be used for modification may include non-halogenated polyolefin formed by (co)polymerizing one or two or more kinds of C2~10 olefin such as ethylene, propylene, butylenes, hexene, and the like, and particularly, it is preferable to include propylene as a polymerization unit. The weight fraction of the propylene unit in the modified polyolefin may be preferably in the range of 0.5~1, particularly 0.7~0.99, more particularly 0.8~0.99, in terms of compatibility with other ingredients or adhesion of the formed coating film, and the like.

As the polyolefin, non-halogenated polyolefin known in the art may be used without specific limitation, but it may be preferable to use those prepared by (co)polymerizing olefin using a single site catalyst as a polymerization catalyst, because it has narrow molecular weight distribution and excellent random copolymerization performance, and the like. The single site catalyst is a polymerization catalyst with uniform (single site) activation point structure, and particularly, a metallocene catalyst is preferable. The metallocene catalyst may be prepared by combining a Group 4~6 or Group 8 transition metal compound having at least one conjugated 5-membered ring ligand or a Group 3 rare earth transition metal compound of metallocene (bis(cyclopentadienyl) metal complex and a derivative thereof) with a cocatalyst, such as aluminoxane or boron-type, and the like, for activating the catalyst, and an organic aluminum compound, such as trimethylaluminum, and the like. The (co) polymerization of olefin may be conducted by a known method, for example, by continuously adding alkyl aluminum and metallocene while supplying olefin, such as propylene and ethylene, and the like, and hydrogen in a reaction vessel.

The unsaturated carboxylic acid or acid anhydride modified polyolefin (a) may be, if necessary, additionally acryl-modified. The acryl unsaturated monomer that can be used for the acryl modification may include those free of halogen, for example, C1~C21 alkylester of (meth)acrylic acid such as methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, lauryl (meth)acrylate, stearyl (meth)acrylate, and the like; C1~C21 hydroxyalkylester of (meth)acrylic acid such as 2-hydroxyethyl (meth)acrylate, 3-hydroxypropyl (meth) acrylate, and the like; other acryl monomer such as (meth) acrylic acid, glycidyl (meth)acrylate, (meth)acrylamide, (meth)acrylonitrile, and the like and additionally styrene, and the like, and they may be used alone or in combination.

Acryl Plyol

If OH % of the acryl polyol resin is less than 2.0%, chemical and physical properties may be deteriorated, and if it is greater than 4.5%, adhesion may be rapidly deteriorated, and thus, the acryl polyol may preferably have OH % of 2.0%~4.5%, particularly 3.0~4.0% for preparing a coating composition with good properties. The content of the acryl polyol in the composition may be preferably 5~40 parts by weight based on 100 parts by weight of the total solid content, and if the acryl content is decreased, chemical properties may be deteriorated and if it is increased, properties may be increased but adhesion may be deteriorated. Particularly, the acryl polyol may maximize physical and chemical properties of the final composition in the maximum content for maintaining good adhesion to a substrate.

The acryl polyol resin is not specifically limited, and the examples may include an aqueous or water dispersible resin having average at least two hydroxyl groups in one molecule, such as acryl resin, acryl modified epoxy resin, a graft body thereof, and the like.

Acryl Emulsion

The content of the acryl emulsion may be preferably 5~40 parts by weight, based on 100 parts by weight of the total solid content, and similarly to the acryl polyol, if the content decreases, physical and chemical properties of the composition may be deteriorated, and as the content increases, adhesion may be deteriorated but the deterioration degree is lower than the acryl polyol, and thus, optimum composition properties may be secured by controlling the ratio of the acryl polyol and the acryl emulsion.

The acryl emulsion is not specifically limited, and the acryl resin emulsion may be obtained by emulsion polymerization of acryl resin polymerization. The acryl resin emulsion may be an emulsion of a multilayered particle shape obtained by multistage emulsion polymerization of a monomer mixture in the presence of water and an emulsifier.

The acryl emulsion may be copolymerized using various acryl monomers. For example, an acryl emulsion may be obtained by polymerizing one or more monomers selected from the group consisting of acryl or methacryl based monomers having an aliphatic group, styrene based monomers, acryl or methacryl based monomers having an acid group, acryl or methacryl based monomers having a hydroxyl group, and tertiary-amine containing monomers, together with a reaction initiator and a reactive emulsifier. Styrene based monomers are preferable because it may improve hardness of the coating, provide gloss and reduce cost.

Solvent

As the solvent, water is used, or a solvent compatible with water, for example, an alcohol based solvent may be mixed.

Curing Agent

The mono coating film type waterborne coating composition according to one embodiment of the invention may further comprise a curing agent. The curing agent may be included during preparation of the composition, or it may be mixed with the composition before the coating operation. The curing agent may include those capable of curing reaction with at least one of the above explained halogen-free polyolefin resin, acryl polyol, and (styrene based) acryl emulsion. Specifically, it may include hexamethylene diisocyante, 4,4-dicyclohexylmethane diisocyanate, 1,4-tetramethylene diisocyanate, 10-decamethylene diisocyanate, isophorone diisocyanate, 1,4-cyclohexane diisocyanate, toluene-2,4-diisocyanate, toluene-2,6-diisocyanate, 1,5-natphthalene diisocyanate, 4-methoxy-1,3-phenylene diisocyanate, 4-chloro-1,3-phenylene diisocyanate, 2,4-dimethyl1,3-phenylene diisocyanate, 4,4-diisocyanate diphenylether, 4,4-diisocyanate dibenzyl, methylene-bis(4-phenyl diisocyanate)-1,3-phenylene diisocyanate, and a combination thereof. The curing agent may be preferably used in the content such that the molar ratio of OH:NCO may become 1:1~1:2.

The aqueous coating composition may, if necessary, further comprise commonly known pigments and additives. The pigment or additives are well known in the art and the explanations are dispensed with. The additives may include surfactant, an antifoaming agent, a thickner, a stabilizer, and the like, but not limited thereto. The aqueous coating composition may further comprise 2~10 parts by weight of the pigment and 0.5~10 parts by weight of the additives, based on 100 parts by weight of the total solid content of the composition.

The present invention also provides a coating film product formed by coating the above explained mono coating film type waterborne coating composition on a polyolefin based substrate. The coating film product may be interior furnishings of an automobile.

Since the above explained mono coating film type waterborne coating composition may provide desired adhesion and physical and chemical properties without a primer layer, the mono coating film type waterborne coating composition may be directly coated on a polyolefin based substrate to form an excellent coating film product. The polyolefin based substrate may be olefinic thermoplastic elastomer (TPO) or polypropylene (PP).

Hereinafter, the present invention will be explained with reference to the examples. However, the following examples are only to illustrate the invention, and the scope of the invention is not limited thereto.

Preparation Example of a Halogen-Free Waterborne Composition

Preparation Example 1

40 parts by weight of halogen-free polyolefin resin of water-dispersed AUROREN AE301 (manufacturer: Nippon Paper Chemicals, non-volatiles 30%, weight average molecular weight 80,000~100,000), 10 parts by weight of acryl poly dispersion XP-2470 (manufacturer: Bayer, non-volatiles 45%, OH % 3.9), 10 parts by weight of an alcohol based solvent, 5 parts by weight of a toner containing 30% of pigment, 25 parts by weight of water, and 10 parts by weight of other additives were used to prepare a coating composition by a common preparation method of waterborne coating composition.

Preparation Example 2

40 parts by weight of halogen-free polyolefin resin of water-dispersed TRAPYLEN 9600W (manufacturer: Tramaco, non-volatiles 30%), 9 parts by weight of acryl poly dispersion XP-2470 (manufacturer: Bayer, non-volatiles 45%, OH % 3.9), 10 parts by weight of an alcohol based solvent, 5 parts by weight of a toner containing 30% of pigment, 25 parts by weight of water, and 10 parts by weight of other additives were used to prepare a coating composition by a common preparation method of waterborne coating composition.

Preparation Example 3

40 parts by weight of halogen-free polyolefin resin of water-dispersed AUROREN AE301 (manufacturer: Nippon Paper Chemicals, non-volatiles 30%, weight average molecular weight 80,000~100,000), 10 parts by weight of styrene type acryl emulsion AS 26090 VP (manufacturer: ALBERDINGK, non-volatiles 48%, MFFT 80° C.), 10 parts by weight of an alcohol based solvent, 5 parts by weight of a toner containing 30% of pigment, 25 parts by weight of water, and 11 parts by weight of other additives were used to prepare a coating composition by a common preparation method of waterborne coating composition.

Preparation Example 4

40 parts by weight of halogen-free polyolefin resin of water-dispersed AUROREN AE301 (manufacturer: Nippon Paper Chemicals, non-volatiles 30%, weight average molecular weight 80,000~100,000), 5 parts by weight of acryl poly dispersion XP-2470 (manufacturer: Bayer, non-volatiles 45%, OH % 3.9), 5 parts by weight of styrene type acryl emulsion AS 26090 VP (manufacturer: ALBERDINGK, non-volatiles 48%, MFFT 80° C.), 10 parts by weight of an alcohol based solvent, 5 parts by weight of a toner containing 30% of pigment, 25 parts by weight of water, and 11 parts by weight of other additives were used to prepare a coating composition by a common preparation method of waterborne coating composition.

Comparative Preparation Example 1

40 parts by weight of halogen-free polyolefin resin of water-dispersed SUPERCHLONE S-4269 (manufacturer: Nippon Paper Chemicals, non-volatiles 30%, weight average molecular weight 80,000~110,000), 10 parts by weight of acryl poly dispersion XP-2470 (manufacturer: Bayer, non-volatiles 45%, OH % 3.9), 10 parts by weight of an alcohol based solvent, 5 parts by weight of a toner containing 30% of pigment, 25 parts by weight of water, and 10 parts by weight of other additives were used to prepare a coating composition by a common preparation method of waterborne coating composition.

Comparative Preparation Example 2

40 parts by weight of halogen-free polyolefin resin of water-dispersed SUPERCHLONE S-4269 (manufacturer:

Nippon Paper Chemicals, non-volatiles 30%, weight average molecular weight 80,000~110,000), 5 parts by weight of acryl poly dispersion XP-2470 (manufacturer: Bayer, non-volatiles 45%, OH % 3.9), 5 parts by weight of styrene type acryl emulsion AS 26090 VP (manufacturer: ALBERDINGK, non-volatiles 48%, MFFT 80° C.), 10 parts by weight of an alcohol based solvent, 5 parts by weight of a toner containing 30% of pigment, 25 parts by weight of water, and 11 parts by weight of other additives were used to prepare a coating composition by a common preparation method of waterborne coating composition.

Example 1

A halogen type waterborne Primer Aqua-300 primer (available from SSCP Co. Ltd.) was respectively coated on PP based HT260 (manufacturer: Hyundai EP) and TPO based Multibase 4101 (manufacturer: Multibase) to a dried coating film of thickness of 8~12 μm, and then, dried at 80° C. for 10 minutes. A two liquid type waterborne coating composition of Resoaqua-Deco #100 Black (available from SSCP Co. Ltd.) was mixed with a curing agent such that the molar ratio of OH:NCO becomes 1:1.5, and then, the mixture was coated on the dried substrate to a dried coating film thickness of 25~30 μm, dried at 80° C. for 30 minutes, and allowed to stand for 3 days, and then, a test was conducted.

Example 2

The coating composition of the Comparative Preparation Example 1 was mixed with an isocyanate curing agent such that the molar ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° C. for 30 minutes, and allowed to stand for 3 days, and then, a test was conducted.

Example 3

The coating composition of the Comparative Preparation Example 2 was mixed with an isocyanate curing agent such that the mole ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° C. for 30 minutes, and allowed to stand for 3 days, and then, a test was conducted.

Example 4

The coating composition of the Preparation Example 1 was mixed with an isocyanate curing agent such that the mole ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° C. for 30 minutes, and allowed to stand for 3 days, and then, a test was conducted.

Example 5

The coating composition of the Preparation Example 2 was mixed with an isocyanate curing agent such that the mole ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° C. for 30 minutes, and allowed to stand for 3 days, and then, a test was conducted.

Example 6

The coating composition of the Preparation Example 3 was mixed with an isocyanate curing agent such that the mole ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° C. for 30 minutes, and allowed to stand for 3 days, and then, a test was conducted.

Example 7

The coating composition of the Preparation Example 4 was mixed with an isocyanate curing agent such that the mole ratio of OH:NCO becomes 1:1.5, and the mixture was respectively coated on PP based HT260 (manufacturer: Hyundai EP) and TPO based Multibase 4101 (manufacturer: Multibase) to a dried coating film of thickness of 25-30 μm, dried at 80° for 30 minutes, and allowed to stand for 3 days, and then, a test was conducted.

EXPERIMENTAL EXAMPLE

Measurement of Physical/Chemical Properties

Experimental Example 1

Evaluation of Initial Adhesion According to ASTM D3359-87

Adhesions of the coating film products of Examples 1 to 10 were confirmed according to a substrate.

For adhesion test, hairline pattern was printed and c×1 mm were made, and adhesion test was conducted 5 times with a 3M tape.

Experimental Example 2

Acid Resistance (1) Dropping Test 0.2 $cm^2$ (ml) of 0.5% sulfuric acid and 0.1N hydrochloric acid were dropped on the surface of the coating film, and the coating film was allowed to stand at room temperature for 24 hours, washed with water, surface moisture was removed by AIR BLOW, and then, allowed to stand at room temperature for 1 hour. The surface state of the coating film was examined, and an adhesion test was immediately conducted according to 5, 7 sections.

(2) Immersion Test

The sample was immersed in 5% sulfuric acid controlled to 30±2° C. for 3 hours, and then, the surface state of the coating film was examined. However, this test was applied only to the mono liquid type solid and mono liquid type metallic (including pearl)+mono liquid type acryl coating composition.

Experimental Example 3

Moisture Resistance

Moisture resistances of the coating film products of Examples 1 to 10 were evaluated.

No discoloration and foaming, and adhesion were confirmed using a thermo-hygrostat at 50±2° C., humidity RH 98±2% (240 Hr).

Experimental Example 4

Suncream Resistance

On an acryl plate (50 mm×50 mm), 2 pieces of white cotton cloths of the same size were overlapped and put, and then, 0.25 g of the suncream prescribed in Table 12 was coated on the entire side. The suncream coated part was put on a test product, and the acryl plate was pressed to adhere.

It was allowed to stand in a thermostat of 80±2° C. for 1 hour, and then, taken out to remove the white cotton cloths and the acryl plate.

Then, it was allowed to stand at room temperature for 10~15 minutes, and then, washed with a neutral detergent and dried.

The surface state of the coating film was examined, and immediately, adhesion test of 5, 7 sections and scratch test of 5.6 sections were conducted under the conditions of Table 12.

Experimental Example 5

Heating and Cooling Cycle Test

Adhesion, no discoloration and foaming were confirmed using a heating and cooling device with 3 cycles of 80±2° C.×3 h→room temperature 1 h→40° C.×3 h→room temperature 1 h→50±2+ C., 95% RH×7~15 h→room temperature 1 h.

Experimental Example 6

Heat Resistance

No discoloration and foaming, and adhesion were confirmed using an oven at 80±2° C. (300 hr).

Experimental Example 7

Alkali Resistance 0.2 ml of 0.1N sodium hydroxide was dropped on the surface of the coating film, and the coating film was allowed to stand at a temperature of 20±2° C., humidity of 65±5% for 24 hours, and then, taken out, washed with water, surface moisture was removed by AIR BLOW, and then, allowed to stand at room temperature for 1 hour. Then, the appearance change of the coating film was examined.

Of the results of the Experimental Examples 1~7, the results of coating on TPO based Multibase 4101 are summarized in the following Table 1 (faulty: X, insufficient: Δ, excellent: ○, very excellent: ⊚)

TABLE 1

|  | Experimental Example 1 | Experimental Example 2 | Experimental Example 3 | Experimental Example 4 | Experimental Example 5 | Experimental Example 6 | Experimental Example 7 |
|---|---|---|---|---|---|---|---|
| Example 1 | ⊚ | ⊚ | ⊚ | ○ | ⊚ | ⊚ | ⊚ |
| Example 2 | ○ | ○ | ○ | Δ | ○ | ○ | ○ |
| Example 3 | ⊚ | ⊚ | ⊚ | ○ | ⊚ | ⊚ | ⊚ |
| Example 4 | ○ | ○ | ○ | Δ | ○ | ○ | ○ |
| Example 5 | ○ | Δ | Δ | Δ | Δ | ○ | ○ |
| Example 6 | ○ | ○ | ○ | ○ | ○ | ○ | ○ |
| Example 7 | ⊚ | ⊚ | ⊚ | ○ | ⊚ | ⊚ | ⊚ |

Of the results of the Experimental Examples 1~7, the results of coating on PP based HT260 are summarized in the following Table 2 (faulty: X, insufficient: Δ, excellent: ○, very excellent: ⊚)

TABLE 2

|  | Experimental Example 1 | Experimental Example 2 | Experimental Example 3 | Experimental Example 4 | Experimental Example 5 | Experimental Example 6 | Experimental Example 7 |
|---|---|---|---|---|---|---|---|
| Example 1 | ⊚ | ⊚ | ⊚ | ○ | ⊚ | ⊚ | ⊚ |
| Example 2 | ○ | Δ | Δ | Δ | Δ | ○ | ○ |
| Example 3 | ○ | ○ | ○ | ○ | ○ | ○ | ○ |
| Example 4 | ○ | Δ | Δ | Δ | Δ | ○ | ○ |
| Example 5 | Δ | Δ | Δ | Δ | Δ | Δ | ○ |
| Example 6 | ○ | ○ | ○ | Δ | Δ | ○ | ○ |
| Example 7 | ○ | ○ | ○ | ○ | ○ | ○ | ○ |

Referring to the above results, when the halogen-free waterborne coating composition was applied, physical/chemical properties differed according to the kind and contents of the ingredients, and particularly, if acryl polyol and acryl emulsion were mixed with halogen-free polyolefin resin, although not reaching the properties of the existing double coating film, generally excellent properties were exhibited. Namely, it can be seen that on the single coating film-formed substrate, the property of halogen-free type was similar to the halogen-type, and particularly, on TPO, similar property to double coating film was exhibited.

What is claimed is:

1. A mono coating film type waterborne coating composition comprising 25 to 65 parts by weight of a halogen free polyolefin resin, 5 to 40 parts by weight of an acryl polyol, 5 to 40 parts by weight of an acryl emulsion, and a solvent, based on 100 parts by weight of total solid content;
wherein the halogen free polyolefin resin has a weight average molecular weight of 80,000 to 150,000 and the acryl polyol has an OH % of 2.0 to 4.5%.

2. The mono coating film type waterborne coating composition according to claim 1, further comprising 2 to 20 parts by weight of a pigment, based on 100 parts by weight of total solid content.

3. The mono coating film type waterborne coating composition according to claim 1, wherein the halogen free polyolefin resin is acryl modified polyolefin.

4. The mono coating film type waterborne coating composition according to claim 1, wherein the acryl emulsion is a styrene based acryl emulsion.

5. The mono coating film type waterborne coating composition according to claim 1, further comprising a curing agent.

6. A coating film product obtained by coating the mono coating film type waterborne coating composition according to claim 1 on a polyolefin based substrate.

7. The coating film product according to claim 6, wherein the mono coating film type waterborne coating composition is coated without treating the polyolefin based substrate with a primer.

8. The coating film product according to claim 6, wherein the polyolefin based substrate is an olefinic thermoplastic elastomer (TPO) or a polypropylene (PP).

9. A method of coating comprising:
coating the mono coating film type waterborne coating composition according to claim 1 onto a polyolefin based substrate.

10. The method according to claim 9, wherein the mono coating film type waterborne coating composition is coated without treating the polyolefin based substrate with a primer.

11. The method according to claim 9, wherein the polyolefin based substrate is an olefinic thermoplastic elastomer (TPO) or a polypropylene (PP).

12. A coating film product obtained by coating the mono coating film type waterborne coating composition according to claim 1 on a polyolefin based substrate.

13. A coating film product obtained by coating the mono coating film type waterborne coating composition according to claim 2 on a polyolefin based substrate.

14. A coating film product obtained by coating the mono coating film type waterborne coating composition according to claim 3 on a polyolefin based substrate.

15. A coating film product obtained by coating the mono coating film type waterborne coating composition according to claim 4 on a polyolefin based substrate.

16. A coating film product obtained by coating the mono coating film type waterborne coating composition according to claim 5 on a polyolefin based substrate.

17. The mono coating film type waterborne coating composition according to claim 2, wherein the halogen free polyolefin resin is acryl modified polyolefin.

18. The mono coating film type waterborne coating composition according to claim 3, wherein the acryl emulsion is a styrene based acryl emulsion.

19. The mono coating film type waterborne coating composition according to claim 2, further comprising a curing agent.

* * * * *